(12) United States Patent
Usuda et al.

(10) Patent No.: US 6,999,427 B1
(45) Date of Patent: Feb. 14, 2006

(54) CDMA RECEPTION APPARATUS AND RECEIVED SIGNAL POWER MEASURING APPARATUS IN CDMA MOBILE COMMUNICATION SYSTEM

(75) Inventors: Masafumi Usuda, Kanagawa (JP);
Yoshihiro Ishikawa, Kanagawa (JP);
Seizo Onoe, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 676 days.

(21) Appl. No.: 09/619,361

(22) Filed: Jul. 19, 2000

(30) Foreign Application Priority Data

Jul. 21, 1999 (JP) ................................. 11-206789

(51) Int. Cl.
*H04B 7/185* (2006.01)
(52) U.S. Cl. ...................... 370/318; 370/335; 370/519; 455/522
(58) Field of Classification Search ................ 370/316, 370/374, 335, 320, 324, 328, 334, 339, 342, 370/350, 487, 486, 490, 491, 500, 503, 508, 370/509, 514, 488, 333, 302, 330; 455/522, 455/226.2–227, 407–408, 517, 228, 229; 575/130, 136, 140, 142, 143, 147, 149, 150, 575/215, 40, 226
See application file for complete search history.

(56) References Cited

U.S. PATENT DOCUMENTS

| 4,995,104 | A | * | 2/1991 | Gitlin .......................... 370/201 |
| 5,265,119 | A | * | 11/1993 | Gilhousen et al. .......... 370/335 |
| 5,297,161 | A | * | 3/1994 | Ling ........................... 375/130 |
| 5,305,468 | A | | 4/1994 | Bruckert et al. .............. 455/69 |
| 5,566,165 | A | * | 10/1996 | Sawahashi et al. ......... 370/342 |
| 5,590,409 | A | * | 12/1996 | Sawahashi et al. ........... 455/69 |
| 5,604,766 | A | * | 2/1997 | Dohi et al. .................. 375/130 |
| 5,621,723 | A | | 4/1997 | Walton, Jr. et al. ........... 370/18 |
| 5,732,334 | A | * | 3/1998 | Miyake ....................... 455/126 |
| 5,923,712 | A | * | 7/1999 | Leyendecker et al. ...... 375/297 |
| 5,924,043 | A | * | 7/1999 | Takano ....................... 455/522 |
| 5,959,965 | A | * | 9/1999 | Ohkubo et al. ............. 370/203 |
| 6,070,086 | A | * | 5/2000 | Dobrica ...................... 455/522 |
| 6,088,324 | A | * | 7/2000 | Sato ........................... 370/203 |
| 6,144,860 | A | * | 11/2000 | Komatsu .................... 455/522 |

(Continued)

FOREIGN PATENT DOCUMENTS

EP        0 798 879 A2    10/1997

(Continued)

OTHER PUBLICATIONS

Korean Office Action for app. No. 10-2000-0041663.

(Continued)

*Primary Examiner*—Chau Nguyen
*Assistant Examiner*—Ian N. Moore
(74) *Attorney, Agent, or Firm*—Workman Nydegger

(57) ABSTRACT

In a CDMA reception apparatus, averaging part for averaging at least one of vector, amplitude and power of received signal of a plurality of transmit power control sections is provided. Further, propagation path variation estimator for estimating a propagation path variation of the present transmit power control section from respective transmit power control sections in the past to obtain a propagation path variation estimation value and propagation path variation correction part (multiplier) for correcting by the propagation path variation estimation value are further provided, wherein the averaging part averages at least one of vector, amplitude and power of received signal of the plurality of transmit power control sections corrected by the propagation path variation correction part (multiplier). With this configuration, the measurement accuracy is improved by measuring received signal power using a plurality of slots including past slots, resulting in more accurate transmit power control.

12 Claims, 11 Drawing Sheets

U.S. PATENT DOCUMENTS

| | | | |
|---|---|---|---|
| 6,178,194 B1 * | 1/2001 | Vasic | 375/136 |
| 6,208,292 B1 * | 3/2001 | Sih et al. | 342/357.12 |
| 6,208,632 B1 * | 3/2001 | Kowalski et al. | 370/335 |
| 6,249,682 B1 * | 6/2001 | Kubo et al. | 455/522 |
| 6,304,749 B1 * | 10/2001 | Obara | 455/126 |
| 6,333,934 B1 * | 12/2001 | Miura | 370/441 |
| 6,347,083 B1 * | 2/2002 | Nishino | 370/342 |
| 6,347,231 B1 * | 2/2002 | Miya | 455/522 |
| 6,377,809 B1 * | 4/2002 | Rezaiifar et al. | 455/455 |
| 6,385,184 B2 * | 5/2002 | Kitade et al. | 370/337 |
| 6,389,296 B1 * | 5/2002 | Shiraki et al. | 455/522 |
| 6,404,757 B1 * | 6/2002 | Ohshima | 370/342 |
| 6,434,131 B1 * | 8/2002 | Sari | 370/335 |
| 6,438,362 B1 * | 8/2002 | Amezawa | 455/226.3 |
| 6,442,405 B1 * | 8/2002 | Hiramatsu et al. | 455/562.1 |
| 6,650,872 B1 * | 11/2003 | Karlsson | 370/329 |
| 6,687,511 B2 * | 2/2004 | McGowan et al. | 455/522 |

FOREIGN PATENT DOCUMENTS

| | | |
|---|---|---|
| EP | 0 833 472 A1 | 4/1998 |
| EP | 0 851 642 A2 | 7/1998 |
| EP | 0 854 588 A2 | 7/1998 |
| JP | 06-013956 | 1/1994 |
| JP | 06 276053 A | 9/1994 |
| JP | 10-013364 | 1/1998 |
| JP | 10-126337 | 5/1998 |
| JP | 11-122212 | 4/1999 |

OTHER PUBLICATIONS

"Optimizing the Number of Dedicated Pilot Symbols for Forward Link in W-CDMA Systems", 2000 IEEE 51$^{st}$ Vehicular Technology Conference, vol. 1, IEEE Catalog No. OOCH37026, M. Usuda et al.

B-330 "Study on an SIR Measuring Method in DS-CDMA Adaptive Transmission Power Control" by Syunsuke Kiyoo et al., Handbook b-330 of Lectures in IEICE Communication Society Conference in 1996 (concise English translation is attached).

Official Notice of Rejection; Case No.: DCMH110067 Japanese Patent Application No.: 11-206789.

* cited by examiner

CDMA RECEPTION APPARATUS AND RECEIVED SIGNAL POWER MEASURING APPARATUS IN CDMA MOBILE COMMUNICATION SYSTEM This application is based on Patent Application No. 11-206789 (1999) filed Jul. 21, 1999 in Japan, the contents of which are incorporated hereinto by reference.

BACKGROUND OF THE INVENTION

1. Field of the Invention

The present invention relates to a mobile communication reception apparatus in mobile communications applied with digital radio communication system, particularly with CDMA (code division multiple access) system, more specifically to received signal power measurement for transmit power control.

2. Description of the Prior Art

An example of relationship between flow of transmit power control of CDMA mobile communication system by the prior art and radio slot configuration is schematically shown in FIG. 1.

As shown in FIG. 1, 1) received signal power measurement is performed for each transmit power control section (hereinafter referred to as "slot"), 2) the measurement result is subjected to a division calculation using a measurement result of noise interference power to obtain a received SNIR (signal power to interference power ratio), the received SNIR is compared with a reference SNIR, 4) a transmit power control bit is transmitted designating a transmit power control indicator of the received side channel, so that when the comparison result exceeds the reference SNIR, a base station transmit power is decreased, or when the comparison result is below the reference SNIR, the base station transmit power is increased.

As shown in FIG. 1, in the traffic channel, there exists not only a fixed transmit part (shaded in FIG. 1) in which the number of transmit bits is unchanged, but also a variable transmit part in which the transmit bit number is successively changed according to a change in information speed of transmitted data, when there is no data, transmit is stopped. In this case, the fixed transmit part is applied to received signal power measurement.

As shown above, received signal power measurement in a CDMA reception apparatus is performed using a fixed transmit part, however, there is a problem that when signal power of the fixed transmit part is small, measurement accuracy of received signal power is deteriorated, and transmit power control is not performed with good accuracy.

As described above, accuracy degradation of transmit power control has resulted in an increase in transmit power and deterioration of channel capacity.

SUMMARY OF THE INVENTION

An object of the present invention is to improve the measurement accuracy by measuring received signal power using a plurality of slots including past slots, thereby performing even more accurate transmit power control. With this, the object is to achieve improvement of communication quality, reduction of transmit power and increase of capacity.

Further, when using received signals of a plurality of slots including past slots in measurement of received power, measurement accuracy is improved when the traveling speed of the mobile terminal is slow since the propagation path variation is small, however, when the traveling speed of the mobile terminal is high, since the propagation path variation is large, there is a possibility that the measurement accuracy is deteriorated. As shown, the number of slots used for received signal power measurement suitable for accuracy is varied with the traveling speed. Further, to use signals of past slots for measurement of received signal power, by averaging a result of multiplying a change in variation of propagation path and a change in transmit power changed by transmit power control from a past to present, measurement accuracy can be improved. In particular, other than a dedicated traffic channel which is applied to transmit power control, in a downlink where channel reception of a common channel of fixed transmit power is possible such as a pilot channel, it is possible to estimate propagation path variation using the common channel. However, as there is a variation in propagation path or as estimation accuracy of change in transmit power is degraded, there may be a case where received signal power measurement accuracy is deteriorated by using past slot signals for measurement. In particular, when the fixed transmit part in the above-described slot is large, since many measurable received signals are present in 1 slot, the accuracy is better than averaging many slots, when the number of slots to be averaged is small, or in some case, when there is only one slot to be averaged. Still further, also in a downlink, when the propagation path of common channel is different from the propagation path of a dedicated traffic channel such as in the case where a transmit adaptive array antenna is applied to the transmit side, that is, the base station side, propagation path estimation is difficult, and there may be a case where the accuracy is deteriorated by using a plurality of slots of the past. As shown, the optimum number of slots used for received signal power measurement is changed.

Then, an object of the present invention is to achieve received signal power measurement suitable for respective systems and propagation environments by changing the number of averaging slots according to traveling speed, channel format, and system details without changing the algorithm, improve the measurement accuracy, achieve a reduction of transmit power and an increase of capacity, and suppress complexity of reception apparatus, especially complexity of mobile communication terminal apparatus.

In accordance with the present invention which attains the above objects, there is provided a received signal power measurement using a plurality of past slots for improving measurement accuracy of received signal power, making a transmit power control highly accurate, thereby enabling high communication quality, reduction of transmit power, and increased capacity. Further, by changing the number of averaging slots according to the traveling speed, channel format, and system details, it is possible to perform received signal power measurement suitable for respective environments without changing the algorithm, thereby reducing the transmit power, increasing the capacity and suppressing the size of the reception apparatus.

The CDMA reception apparatus and received signal power measurement method described in respective claims are as what follows.

In a first aspect of the present invention, there is provided a CDMA reception apparatus comprising:

propagation path variation estimation means for estimating a propagation path variation in a present transmit power control section from respective transmit power control sections in the past to obtain a propagation path variation estimation value;

propagation path variation correction means for correcting at least one of vector, amplitude and/or power of a received signal of the plurality of transmit power control sections with the propagation path variation estimation value obtained by the propagation path variation estimation means; and averaging means for averaging at least one of vector, amplitude and/or power of received signal of the plurality of transmit power control sections corrected by the propagation path variation correction means.

According to the present invention, by using a plurality of slots including past slots for received signal power measurement, measurement accuracy of received signal power can be improved. Further, when using the past slots for received signal power measurement, by making a correction using an estimation value of propagation path variation from the past slot timing up to the present timing, it is possible to perform received signal power measurement more accurately.

In a second aspect of the present invention, there is provided a CDMA reception apparatus comprising:

transmit power changing amount estimation means for estimating a changing amount of transmit power of a communication partner station varied by transmit power control in the present transmit power control section from respective transmit power control sections in the past;

transmit power changing amount correction means for correcting at least one of vector, amplitude and/or power of a received signal of the plurality of transmit power control sections with the transmit power changing amount estimation value obtained by the transmit power changing amount estimation means; and averaging means for averaging at least one of vector, amplitude and/or power of received signal of the plurality of transmit power control sections corrected by the transmit power changing amount correction means.

According to the present invention, when using the past slots for received signal power measurement, by correcting using a change amount of transmit power from the past slot timing up to the present timing, it is possible to perform received signal power measurement more accurately.

The averaging means may be provided with vector addition means for performing vector addition;

division means for dividing a vector added by the vector addition means with a number of vectors added; and means for converting vector divided by the division means into a power.

According to the present invention, when averaging received signals of a plurality of slots including past slots, by performing averaging by vector addition, it is possible to suppress effects of noise and measurement accuracy of received signal power can be improved.

The averaging means may be provided with amplitude addition means for performing amplitude addition;

division means for dividing an amplitude added by the amplitude addition means with a number of amplitudes added; and means for converting amplitude divided by the division means into a power.

According to the present invention, when averaging received signals of a plurality of slots including past slots, by performing averaging by amplitude addition, simpler and more accurate averaging is possible.

The averaging means may be provided with power addition means for performing power addition;

division means for dividing a power added by the power addition means with a number of powers added.

According to the present invention, when averaging received signals of a plurality of slots including past slots, by performing averaging by power addition, simpler and more accurate averaging is possible.

The propagation path variation estimation means may estimate a propagation path variation using a channel not performing transmit power control.

According to the present invention, when estimating propagation path variation, by using a channel not performing transmit power control (for example, common channel or the like), propagation path variation estimation of high accuracy can be performed.

The transmit power changing amount estimation means may estimate a transmit power changing amount using a transmit power control indicator transmitted from own station.

According to the present invention, when estimating a transmit power changing amount, by using a transmit power control indicator (for example, transmit power control bit) transmitted from its own station, a high accuracy transmit power changing amount estimation is possible.

The averaging means may further comprise averaging section setting means for setting an averaging section.

According to the present invention, by selecting an appropriate averaging section according to the system details and propagation environment, it is possible to perform measurement of received signal power suited to environment without changing the algorithm.

The averaging section setting means may comprise:

means for setting the averaging section to a small section, when performing communication by a channel of which a power allocated to a signal subjected to received signal power measurement existing in each transmit power control section is high; and means for setting the averaging section to a large section, when performing communication by a channel of which a power allocated to a signal subjected to received signal power measurement existing in each transmit power control section is small.

According to the present invention, depending on the power of received signal subjected to received signal power measurement existing between respective transmit power control sections, when the power is high, the averaging section is reduced to decrease effects of error of past received signals, or when the power is low, the averaging section is increased to reduce effects of measurement error due to noise, it is possible to set an averaging section for optimum measurement accuracy.

The averaging section setting means may comprise:

means for setting the averaging section to a large section, when a partner transmit station performs transmit power control, there is a channel other than channel transmitting to the received station and transmitting a channel not performing transmit power control with the same antenna and directivity, and propagation path variation estimation using the channel not performing transmit power control is possible; and means for setting the averaging section to a small section, when a partner transmit station performs transmit power control, there is not a channel other than channel transmitting to the reception station and transmitting a channel not performing transmit power control with the same antenna and directivity, or even when transmitting but not performing transmit power control, and propagation path variation estimation using the channel not performing transmit power control is not possible.

According to the present invention, when estimation of propagation path variation is impossible, since when signals of past slots are used, received power measurement accuracy is deteriorated due to effects of propagation path variation, it is possible to reduce the averaging section and enhance the measurement accuracy.

The averaging section setting means may comprise:
traveling speed detection means for detecting a relative traveling speed between a communication partner station and own station; and
means for setting the averaging section to a small section when the detected traveling speed is large, and for setting the averaging section to a large section when the detected traveling speed is small.

According to the present invention, when a traveling speed is high between the opposite transmit station and the own station, by decreasing the averaging section, it is possible to prevent deterioration of received signal power measurement accuracy due to propagation path variation.

In a third aspect of the present invention, there is provided a received signal power measurement method of a CDMA reception apparatus, comprising:
a propagation path variation estimation step for estimating a propagation path variation in a present transmit power control section from respective transmit power control sections in the past to obtain a propagation path variation estimation value;
a propagation path variation correction step for correcting at least one of vector, amplitude and/or power of a received signal of the plurality of transmit power control sections with the propagation path variation estimation value obtained by the propagation path variation estimation step; and
an averaging step for averaging at least one of vector, amplitude and/or power of received signal of the plurality of transmit power control sections corrected by the propagation path variation correction step.

According to the present invention, by using a plurality of slots including past slots for received signal power measurement, received signal power measurement accuracy can be improved. Further, when using past slots for received signal power measurement, by correcting using an estimation amount of propagation path variation from the past slot timing up to the present timing, it is possible to perform received signal power measurement more accurately.

In a fourth aspect of the present invention, there is provided a received signal power measurement method of a CDMA reception apparatus, comprising:
a transmit power changing amount estimation step for estimating a changing amount of transmit power of a communication partner station varied by transmit power control in the present transmit power control section from respective transmit power control sections in the past;
a transmit power changing amount correction step for correcting at least one of vector, amplitude and/or power of a received signal of the plurality of transmit power control sections with the transmit power changing amount estimation value obtained by the transmit power changing amount estimation step; and
an averaging step for averaging at least one of vector, amplitude and/or power of received signal of the plurality of transmit power control sections corrected by the transmit power changing amount correction step.

According to the present invention, when using past slots for received signal power measurement, by correcting using an estimation value of change amount of transmit power from the past slot timing up to the present timing, it is possible to perform received signal power measurement more accurately.

The averaging step may be provided with a vector addition step for performing vector addition;
a division step for dividing a vector added by the vector addition step with a number of vectors added; and
a step for converting vector divided by the division step into a power.

According to the present invention, when averaging received signals of a plurality of slots including past slots, by performing averaging by vector addition, it is possible to suppress effects of noise and measurement accuracy of received signal power can be improved.

The averaging step may be provided with an amplitude addition step for performing amplitude addition;
a division step for dividing an amplitude added by the amplitude addition step with a number of amplitudes added; and
a step for converting amplitude divided by the division step into a power.

According to the present invention, when averaging received signals of a plurality of slots including past slots, by performing averaging by amplitude addition, simpler and more accurate averaging is possible.

The averaging step may be provided with a step for performing power addition;
a division step for dividing a power added by the power addition step with a number of powers added.

According to the present invention, when averaging received signals of a plurality of slots including past slots, by performing averaging by power addition, simpler and more accurate averaging is possible.

The propagation path variation estimation step may estimate a propagation path variation using a channel not performing transmit power control.

According to the present invention, when estimating propagation path variation, by using a channel not performing transmit power control (for example, common channel or the like), propagation path variation estimation of high accuracy can be performed.

The transmit power changing amount estimation step may estimate a transmit power changing amount using a transmit power control indicator transmitted from own station.

According to the present invention, when estimating a transmit power changing amount, by using a transmit power control indicator (for example, transmit power control bit) transmitted from its own station, a high accuracy transmit power changing amount estimation is possible.

The averaging step may further comprise an averaging section setting step for setting an averaging section.

According to the present invention, by selecting an appropriate averaging section according to the system details and propagation environment, it is possible to perform measurement of received signal power suited to environment without changing the algorithm.

The averaging section setting step may comprise:
a step for setting the averaging section to a small section, when performing communication by a channel of which a power allocated to a signal subjected to received signal power measurement existing in each transmit power control section is high; and
a step for setting the averaging section to a large section, when performing communication by a channel of which a power allocated to a signal subjected to received signal power measurement existing in each transmit power control section is small.

According to the present invention, depending on the power of received signal subjected to received signal power measurement existing between respective transmit power control sections, when the power is high, the averaging section is reduced to decrease effects of error of past received signals, or when the power is low, the averaging section is increased to reduce effects of measurement error due to noise, it is possible to set an averaging section for optimum measurement accuracy.

The averaging section setting step may comprise:
a step for setting the averaging section to a large section, when a partner transmit station performs transmit power control, there is a channel other than channel transmitting to the reception station and transmitting a channel not performing transmit power control with the same antenna and directivity, and propagation path variation estimation using the channel not performing transmit power control is possible; and
a step for setting the averaging section to a small section, when a partner transmit station performs transmit power control, there is not a channel other than channel transmitting to the reception station and transmitting a channel not performing transmit power control with the same antenna and directivity, or even when transmitting but not performing transmit power control, and propagation path variation estimation using the channel not performing transmit power control is not possible.

According to the present invention, when estimation of propagation path variation is impossible, since when signals of past slots are used, received power measurement accuracy is deteriorated due to effects of propagation path variation, it is possible to reduce the averaging section and enhance the measurement accuracy.

The averaging section setting step may comprise:
a step for detecting a relative traveling speed between a communication partner station and own station; and
a step for setting the averaging section to a small section when the detected traveling speed is large, and for setting the averaging section to a large section when the detected traveling speed is small.

According to the present invention, when a traveling speed is high between the opposite transmit station and the own station, by decreasing the averaging section, it is possible to prevent deterioration of received signal power measurement accuracy due to propagation path variation.

The above and other objects, effects, features and advantages of the present invention will become more apparent from the following description of embodiments thereof taken in conjunction with the accompanying drawings.

BRIEF DESCRIPTION OF THE DRAWINGS

FIG. 4 is a diagram showing the relationship of FIGS. 4A and 4B.

DESCRIPTION OF THE PREFERRED EMBODIMENTS

In the following, embodiments of the present invention will be described with reference to the drawings.

The present invention can be applied to a base station reception apparatus as an uplink receiver, however, because the above-described estimation of propagation path variation can be performed by a channel not performing the transmit power control, an example of downlink receiver, that is, a case where a reception apparatus of a mobile communication terminal is used will be described as the following embodiment.

Embodiment 1

Figure 2:
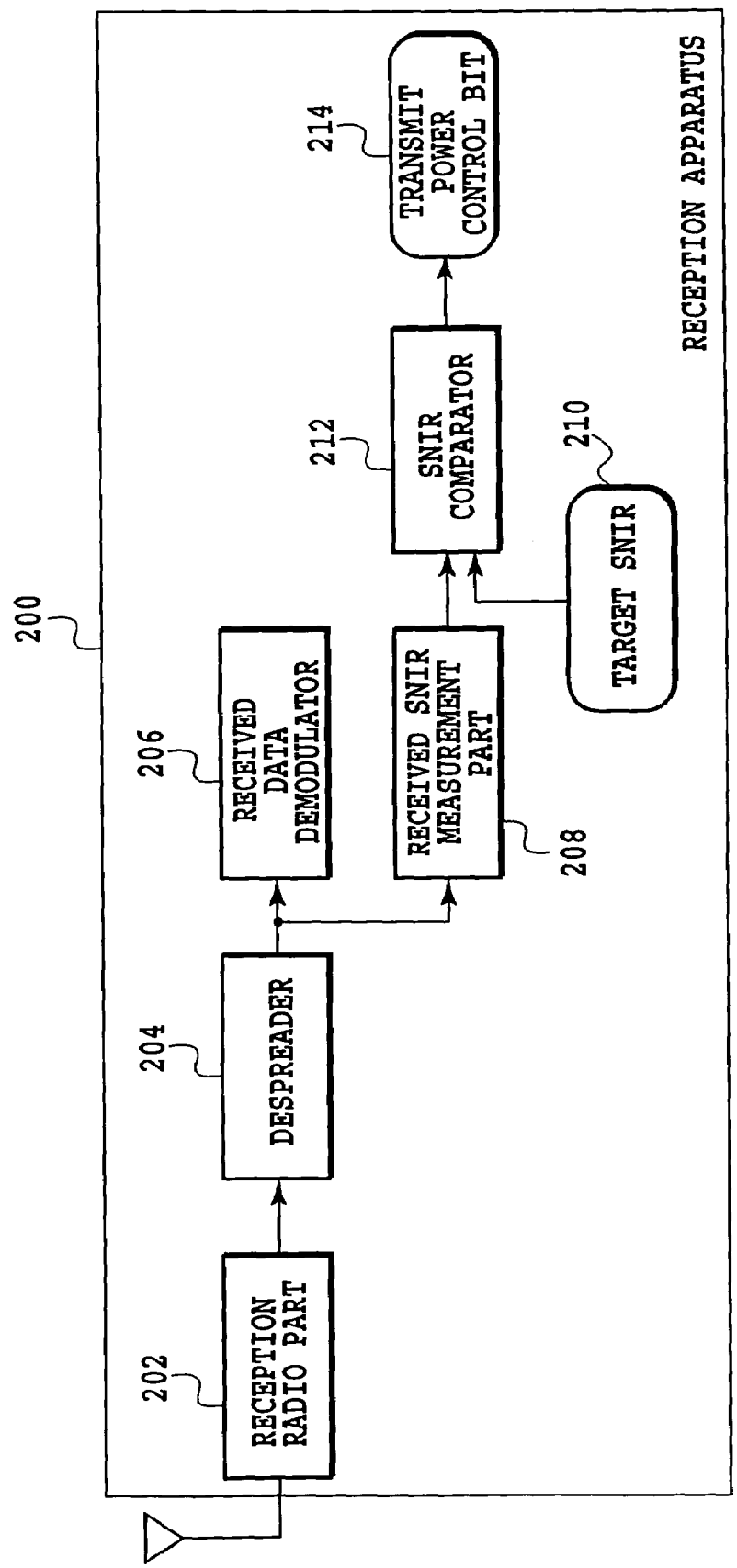
FIG. 2 is a block diagram showing an example of construction of reception apparatus in the CDMA mobile terminal in an embodiment 1 of the present invention.

FIG. 2 is a block diagram showing an example of construction of a reception apparatus in a CDMA mobile terminal in the embodiment 1 of the present invention.

A reception apparatus 200 includes a reception radio part 202, a despreader 204, a received data demodulator 206, a received SNIR measurement part 208 and a SNIR comparator 212.

The reception radio part 202 receives a radio signal transmitted from a radio base station, performs frequency conversion and filtering, and outputs a baseband signal.

In the despreader 204, despreading of the baseband signal is performed, and a received despread signal is outputted to the received data decoder 206 and a received SNIR calculator 208.

In the received data demodulator 206, RAKE combining, error correction decoding and the like are performed to demodulate the received data. At the same time, the received despread signal is inputted to the received SNIR measurement part 208 to output a received SNIR at every slot, a comparison of the outputted value with a target SNIR 210 is performed in the SNIR comparator 212, according to the comparison result, a transmit power control bit 214 (transmit power control indicator) to be transmitted is outputted.

Figure 3:
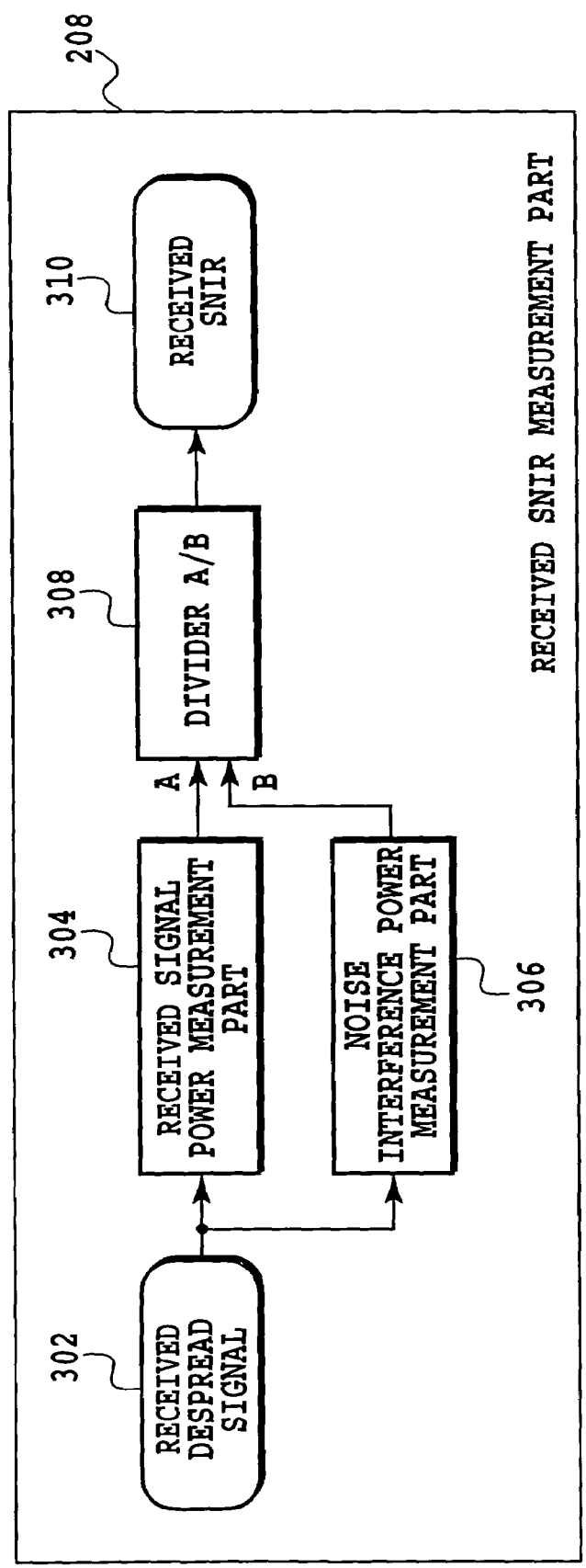
FIG. 3 is a block diagram showing an example of construction of a received SNIR measurement part 208 in FIG. 2.

FIG. 3 is a block diagram showing an example of construction of the received SNIR measurement part 208 in FIG. 2.

The received SNIR measurement part 208 comprises a received signal power measurement part 304, a noise interference power measurement part 306 and a divider 308.

The received despread signal 302 outputted from the despreader 204 is inputted respectively to the received signal power measurement part 304 and the received noise interference power measurement part 306, and the respective measurement results A and B are divided in the divider 308 to obtain a received SNIR 310.

Figure 4A:
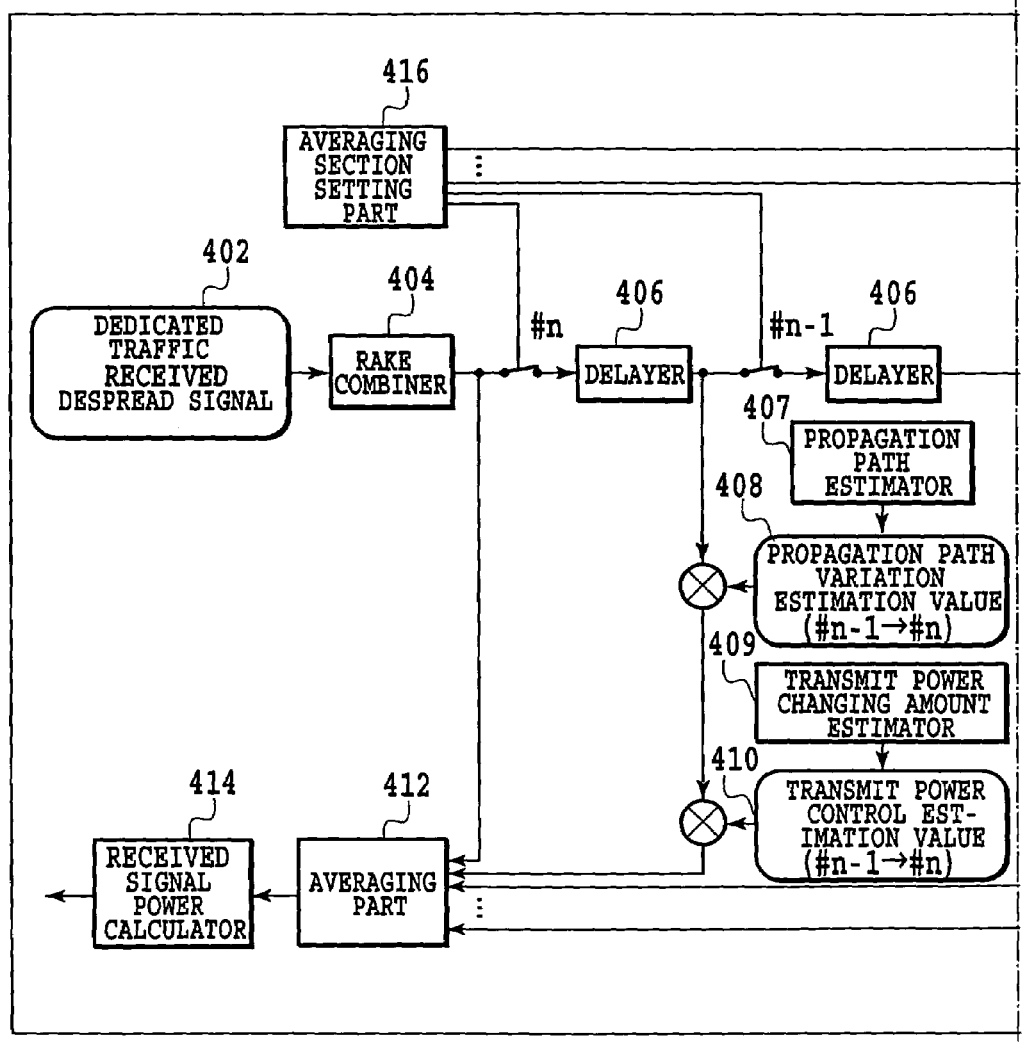
FIG. 4A is a block diagram showing an example of construction of a received signal power measurement part 304 in FIG. 3.
Figure 4B:
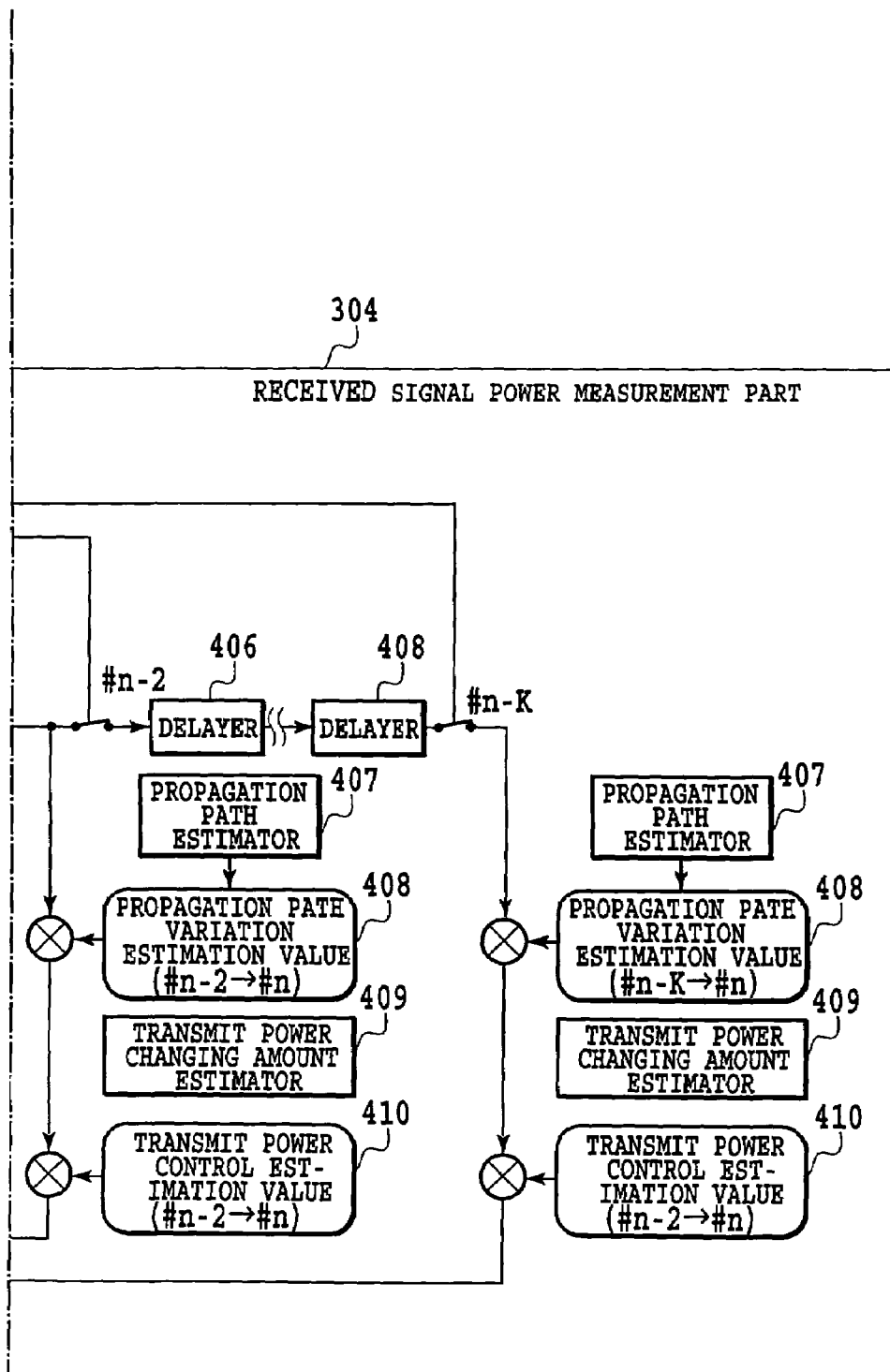
FIG. 4B is a block diagram showing an example of construction of a received signal power measurement part 304 in FIG. 3.

FIGS. 4A and 4B is a block diagram showing an example of construction of the received signal power measurement part 304 in FIG. 3.

Here, in FIGS. 4A and 4B, alphabet n shows a present number of slots, and K a maximum number of received signal slots for performing averaging.

The received signal power measurement part 304 includes a RAKE combiner 404, a delayer 406, a propagation path estimator 407, a transmit power changing amount estimator 409, an averaging part 412, a received signal power calculator 414, and an averaging section setting part 416.

The received despread signal 402 of fixed transmit part of the dedicated traffic channel is RAKE combined by the RAKE combiner 404, and an average value of received signal of each slot is stored in the delayer 406. The stored value can be any of vector, amplitude and/or power. Received signal of past slots stored in the delayer 406 is multiplied by the multiplier with the propagation path variation estimation value 408 of the past slot timing and the present timing generated in the propagation path estimator 407. Further, after multiplication by the multiplier with the estimation value 410 of changing amount of transmit power by transmit power control of the past slot timing and the present timing, averaging is performed along with the present slot in the averaging part 412. Still further, when the stored value is vector or amplitude, it is converted into power by the received signal power calculator 414, and outputted as received signal power.

In the averaging section setting part 416, as will be described later, the averaging section is appropriately set according to the propagation environment and environment of the system in communication.

Figure 10:
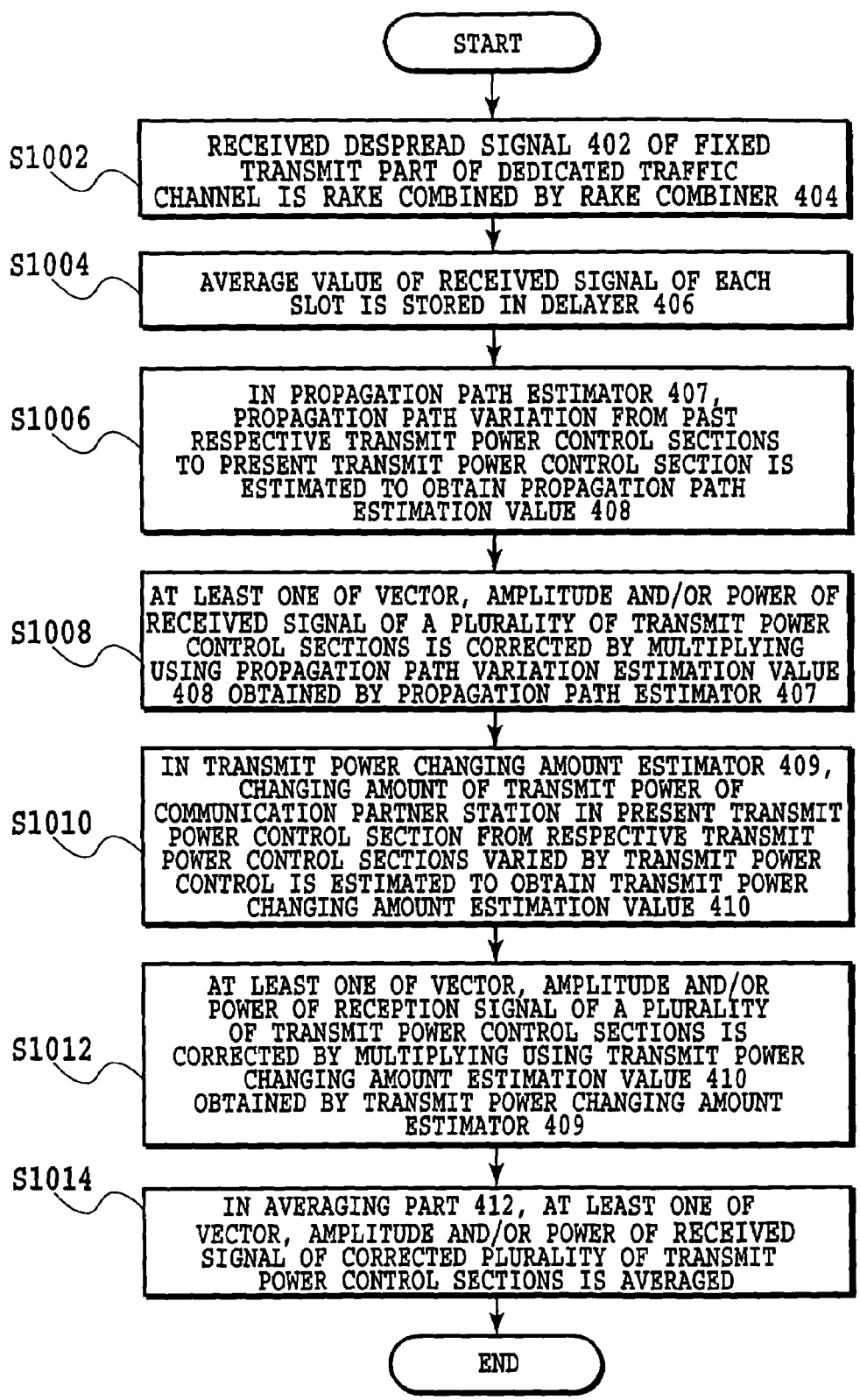
FIG. 10 is a flow chart showing an example of operation of a received signal power measurement part.

FIG. 10 is a flow chart showing an example of operation of the received signal power measurement part 304.

First, received despread signal 402 of fixed transmit part of a dedicated traffic channel is RAKE combined by the RAKE combiner 404 (step S1002).

Next, an average value of received signal of each slot is stored in the delayer 406 (step S1004). The stored value can be any of vector, amplitude and/or power.

Next, in the propagation path estimator 407, propagation path variation in the present transmit control section is estimated from information of respective past transmit power control sections to obtain a propagation path variation estimation value 408 (step S1006).

Next, at least one of vector, amplitude and/or power of received signals of a plurality of transmit power control sections is corrected by multiplying using the propagation path variation estimation value 408 obtained by the propagation path estimator 407 (step S1008).

Next, in the transmit power changing amount estimator 409, a changing amount of transmit power changed by transmit power control of the communication partner station in the present transmit power control section is estimated from information of past respective transmit power control sections (for example, past transmit power control bit data stored in any of storage apparatus (not shown) in the reception apparatus) to obtain a transmit power changing amount estimation value 410 (step S1010).

Next, at least one of vector, amplitude and/or power of received signals of a plurality of transmit power control sections is corrected by multiplying using the transmit power changing amount estimation value 410 obtained by the transmit power changing amount estimator 409 (step S1012).

Next, in the averaging part 412, at least one of vector, amplitude and/or power of the corrected received signals of the plurality of transmit power control sections is averaged (step S1014).

Figure 8:
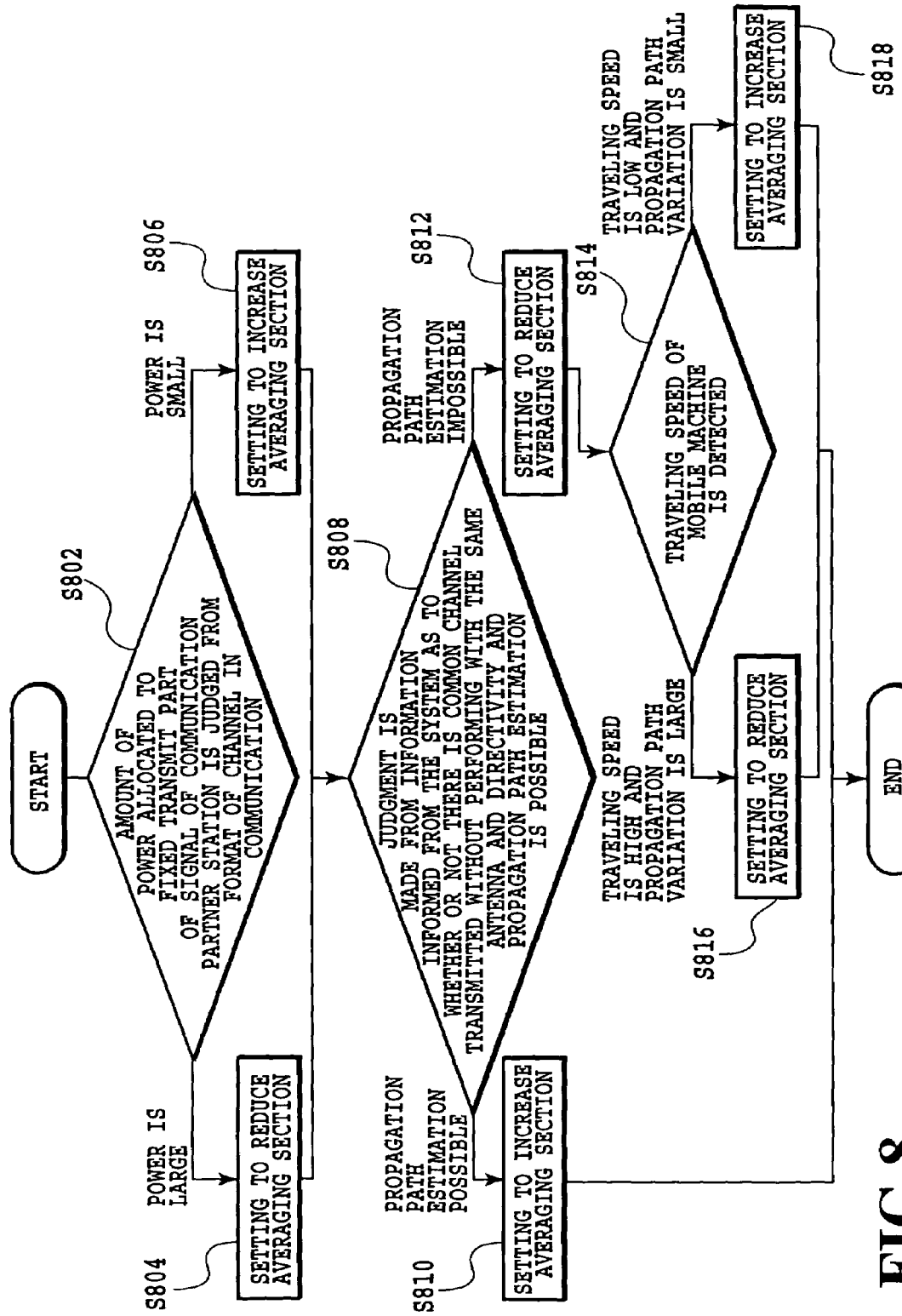
FIG. 8 is a flow chart for explaining a setting method of averaging section in the embodiment 1 of the present invention.

Next, an averaging section setting method in the averaging section setting part 416 will be described with reference to FIG. 8.

Figure 1:
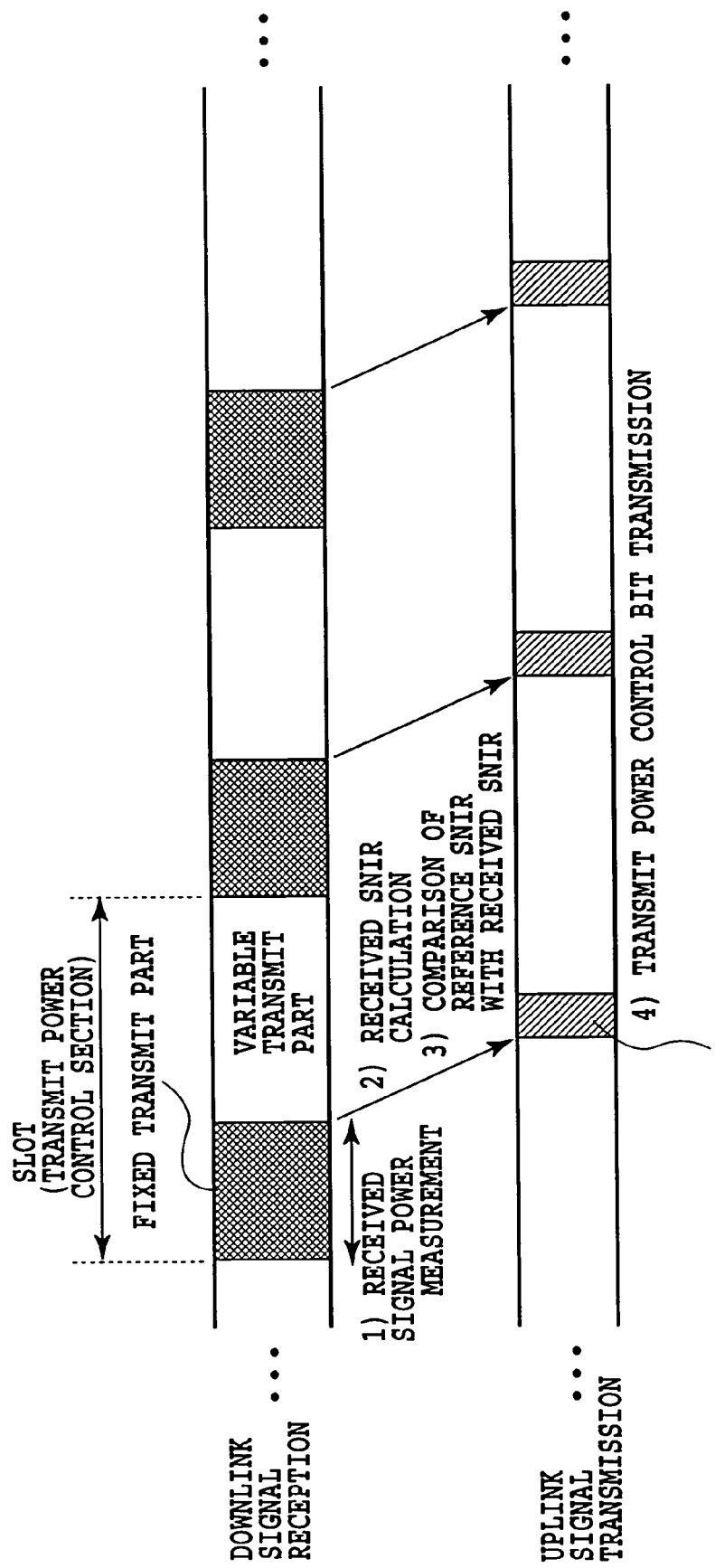
FIG. 1 is a diagram schematically showing an example of relationship between flow of transmit power control of a prior art CDMA mobile communication system and radio slot configuration.

First, for example, the amount of power allocated to the fixed transmit part of signal from the communication partner station corresponding to the shaded part in FIG. 1 is judged from the channel format in communication (step S802), setting is made so that the averaging section is decreased when the power is large (step S804), or the averaging section is increased when the power is small (step S806). Alternatively, a judgment is made from informed information from the system as to whether or not there is a common channel transmitted without performing transmit power with the same antenna and directivity and propagation path estimation is possible (step S808), when propagation path estimation is possible the averaging section is increased (step S810), or when propagation path estimation is impossible the averaging section is decreased (step S812). On the other hand, when propagation path estimation is not performed, traveling speed of the traveling machine is detected (step S814), when the traveling speed is high and variation of propagation path is large, the averaging section is set small (step S816), or when the traveling speed is low and variation of propagation path is small, the averaging section is set large (step S818).

Figure 5:
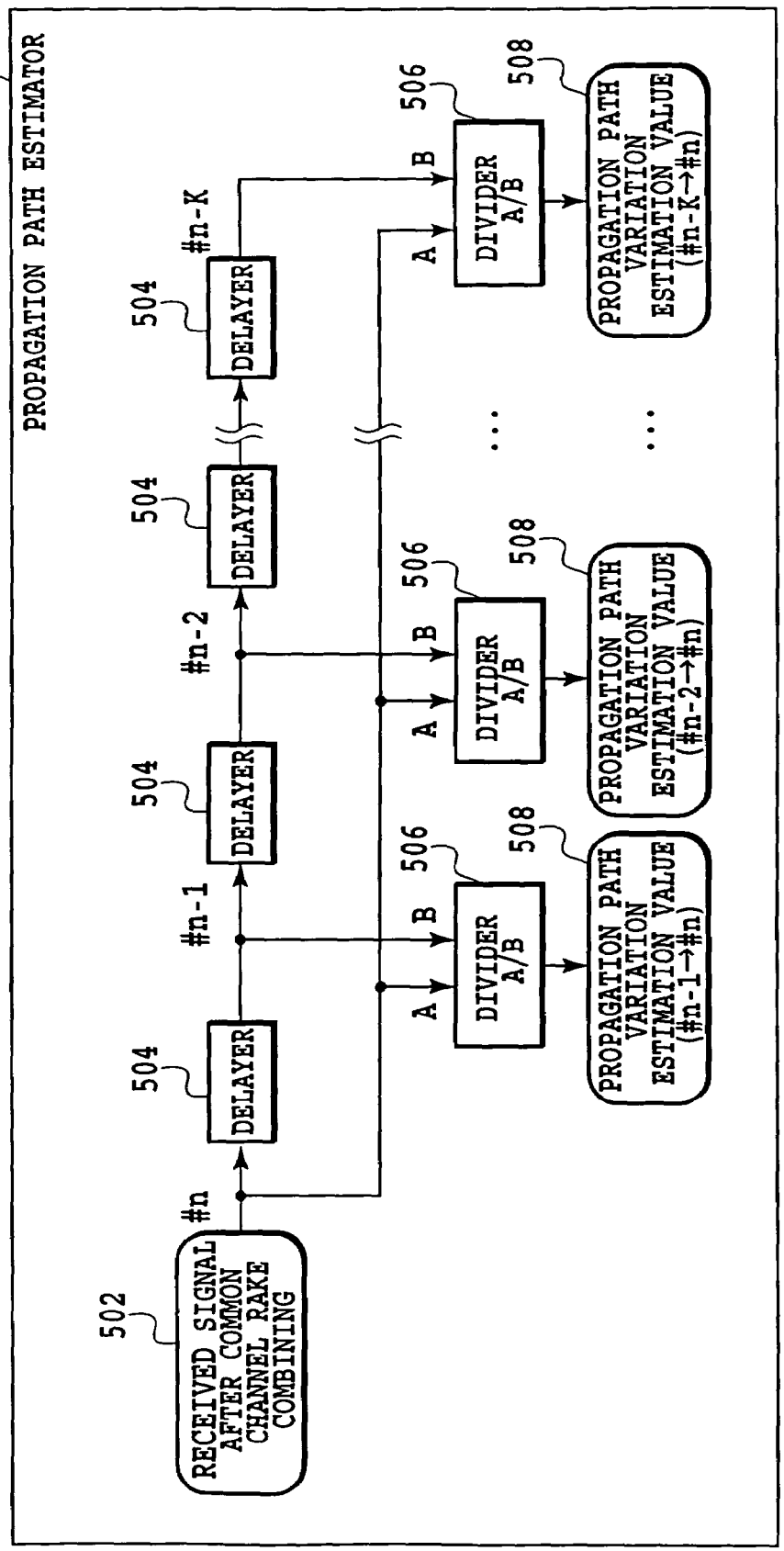
FIG. 5 is a block diagram showing an example of construction of a propagation path estimation part to which the present invention is applied.

FIG. 5 is a block diagram showing an example of construction of the propagation path estimator 407 in FIGS. 4A and 4B.

Here, alphabet n in FIG. 5 shows a present slot number, and K a slot number of largest received signal for averaging.

The propagation path estimator 407 includes a delayer 504 and a divider 506.

In the propagation path estimator 407, amplitude of a received signal 502 after RAKE combining of the common channel not performing transmit power control is stored in the delayer 504 for each slot, by performing division calculation A/B of the received signal A of the present slot and the received signal B of respective past slot in the divider 506, thereby outputting a propagation path variation estimation value 508 of the present slot from the past respective slots.

Figure 6:
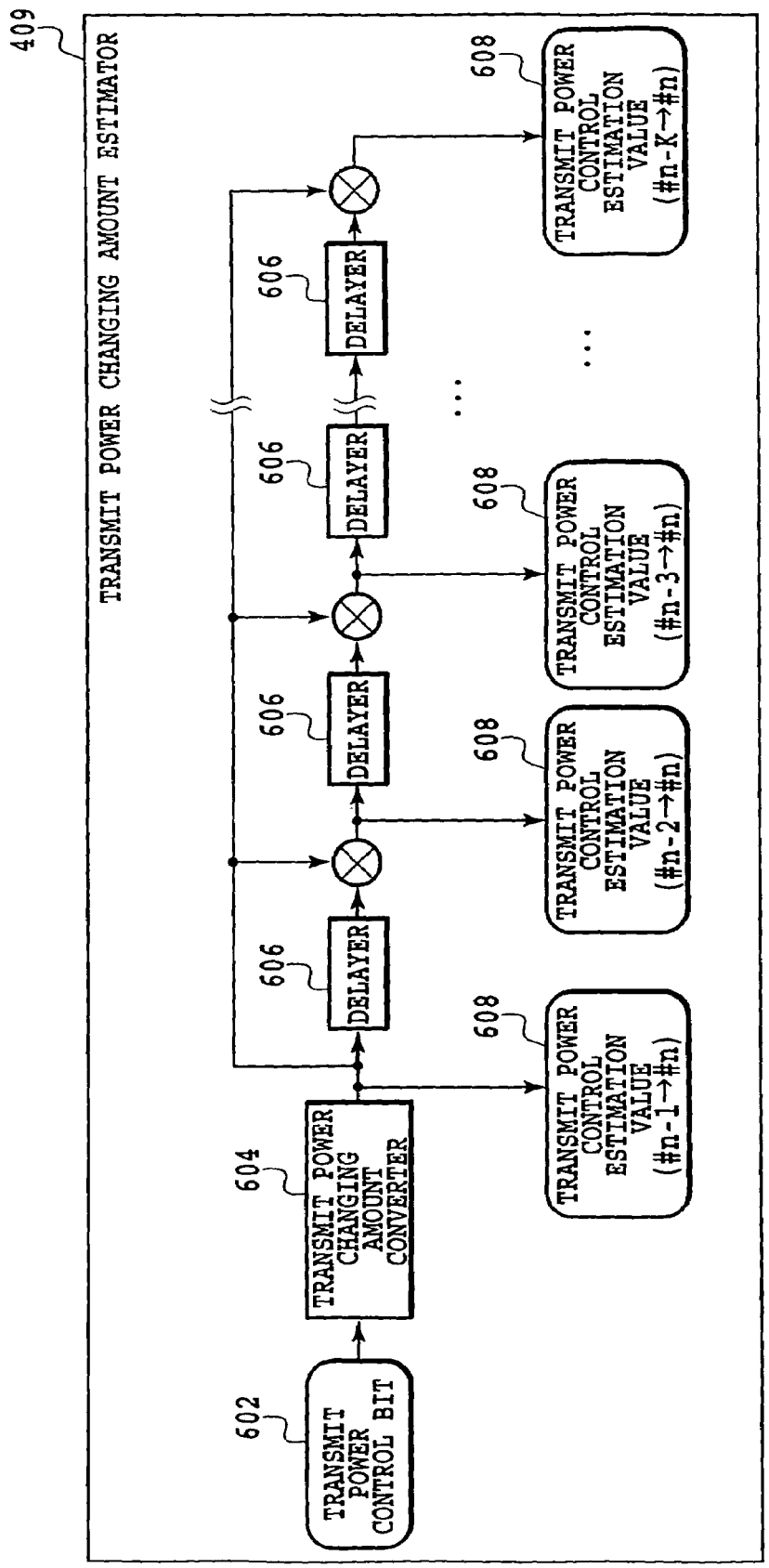
FIG. 6 is a block diagram showing an example of construction of a transmit power changing amount estimation part to which the present invention is applied.

FIG. 6 is a block diagram showing an example of construction of the transmit power changing amount estimator 409 in FIGS. 4A and 4B.

Here, alphabet n in FIG. 6 shows a present slot number, and K a slot number of largest received signal for averaging.

The transmit power changing amount estimator 409 includes a transmit power changing amount converter 604 and a delayer 606.

The transmit power changing amount estimator 409 estimates a changing amount of transmit power from a radio base station from the transmit power control bit 602 transmitted by the mobile terminal to the radio base station.

First, in the transmit power changing amount converter 604, the transmit power control bit 602 transmitted from the mobile terminal is converted into a transmit power changing amount to obtain a transmit power control estimation value 608. Next, output after changing is multiplied with the transmit power changing amount from each slot timing up to the present stored in the delayer 606 to obtain a new transmit power control estimation value 608.

Embodiment 2

In the following, an embodiment 2 according to the present invention will be described with reference to FIG. 7.

Figure 7:
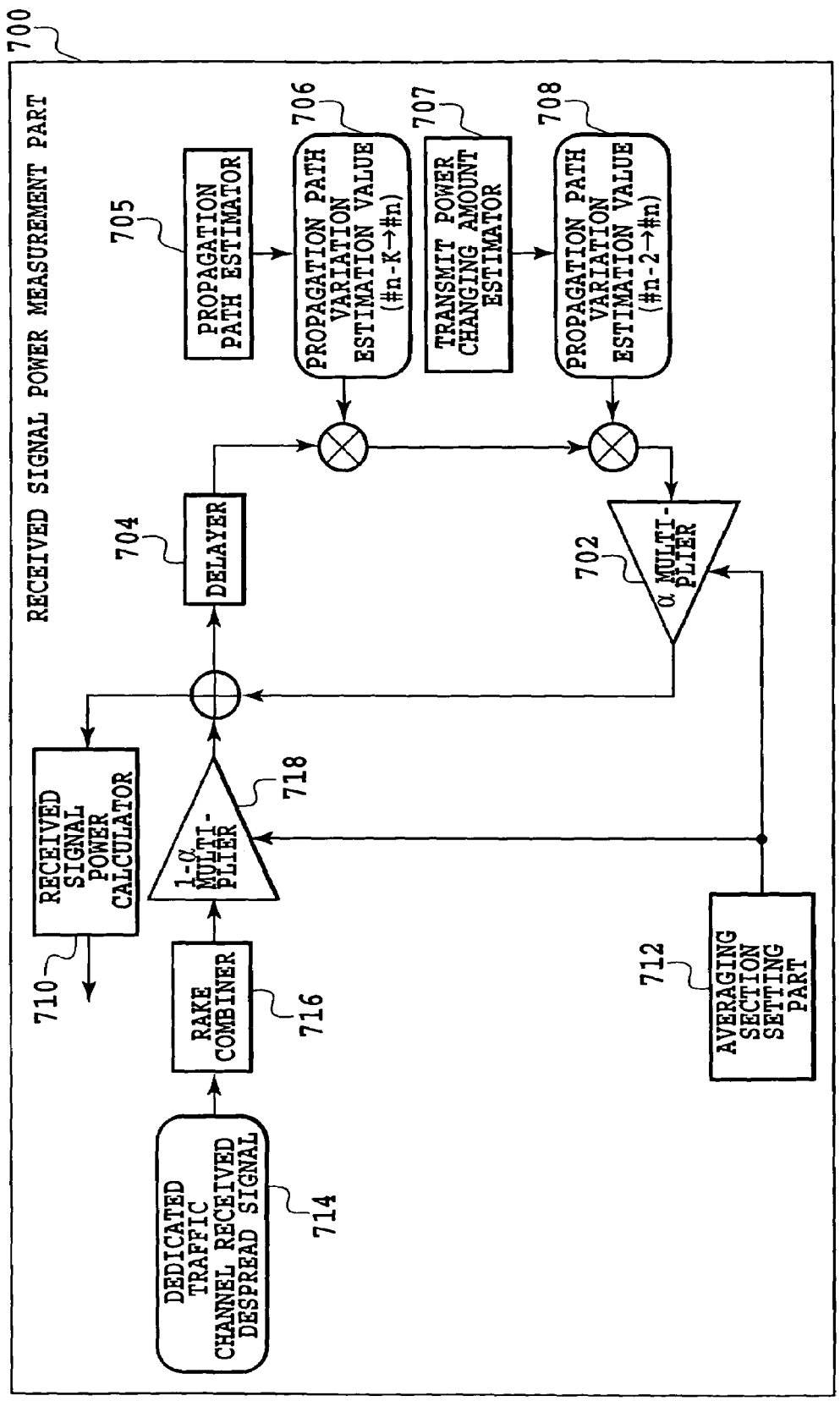
FIG. 7 is a block diagram showing an example of construction of a received signal power measurement part in an embodiment 2 of the present invention.

FIG. 7 is a block diagram showing an example of construction of a received signal power measurement part in the embodiment 2 of the present invention. In the receiver, construction other than the received signal power measurement part is similar to that in the embodiment 1.

A received signal power measurement part 700 in the embodiment 2 includes an a multiplier 702, a delayer 704, a propagation path estimator 705, a transmit power changing amount estimator 707, a received signal power calculator 710, an averaging section setting part 712, a RAKE combiner 716 and a 1−α multiplier 718.

The delayer 704, the propagation path estimator 705, the transmit power changing amount estimator 707, the received signal power calculator 710, the averaging section setting part 712, and the RAKE combiner 716 have the same functions as those described in FIGS. 4 to 9, and the α multiplier 702 and the 1−α multiplier respectively have functions for multiplying the input with α or 1−α.

The received signal power measurement part 700 has a form of a feedback type filter which performs averaging of the received signal of the present slot and the received signal of the past slot using a forgetting factor α702. That is, for the received signal of the past slot stored in the delayer 704, after multiplication with the propagation path variation estimation value 706 between 1 slot previous timing and the present timing and the transmit power changing amount estimation value 708, it is multiplied with the forgetting factor α in the α multiplier 702 to perform averaging with the received signal of the present slot. In the received signal power calculator 710, a received signal power is calculated from received signal after averaging and the result is outputted. On the other hand, received signal after averaging is stored again in the delayer 704. In the averaging section setting part 712, α is appropriately set according to the propagation environment and details of the system in communication.

Figure 9:
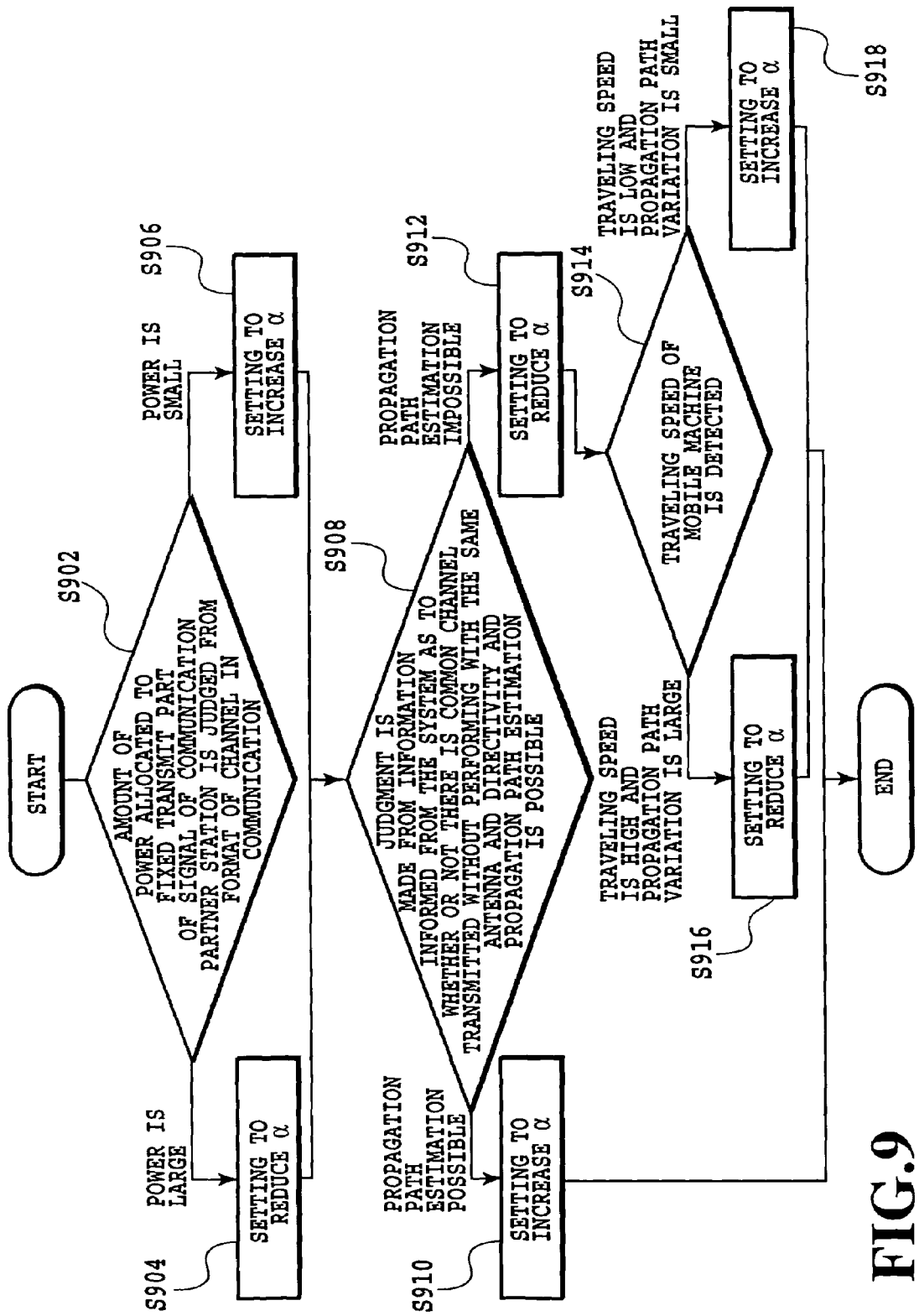
FIG. 9 is a flow chart for explaining a setting method of a forgetting factor $\alpha$ in embodiment 2 of the present invention.

Next, setting method of the forgetting factor α will be described with reference to FIG. 9.

First, for example, the amount of power allocated to the fixed transmit part of signal from the communication partner station corresponding to the shaded part in FIG. 1 is judged from the channel format in communication (step S902), setting is made so that α is decreased when the power is large (step S904), or a is increased when the power is small (step S906). Alternatively, a judgment is made from informed information from the system as to whether or not there is a common channel transmitted without performing transmit power with the same antenna and directivity and propagation path estimation is possible (step S908), when propagation path estimation is possible α is increased (step S910), or when propagation path estimation is impossible α is decreased (step S912). On the other hand, when propagation path estimation is not performed, traveling speed of the traveling machine is detected (step S914), when the traveling speed is high and variation of propagation path is large, α is set small (step S916), or when the traveling speed is low and variation of propagation path is small, α is set large (step S918).

EFFECTS OF THE INVENTION

Effects of Embodiment 1

As shown in FIG. 3, by obtaining the received signal power by averaging a plurality of slots including past slots, even when the fixed transmit part included in 1 slot is small, the effective measurement bit number can be increased, and received power measurement of higher accuracy can be performed.

Further, for the above-shown averaging of a plurality of slots, when a common channel cannot be used for estimation, or when the propagation path fixed transmit part is large, the number of slots for averaging is decreased, or depending on the case, only the present slot is used, averaging by an appropriate averaging slot number can be performed without changing the construction of the receiver and measurement algorithm, whereby high quality communication, reduction of transmit power, and increased channel capacity can be achieved, and complexity of the mobile terminal can be suppressed.

Effects of embodiment 2

With the construction as in the embodiment 2, the same effects as shown in embodiment 1 can be obtained, and averaging of the received signal power is performed by weighting average using the forgetting factor α, buffers such as delayer for storing past received signals can be reduced.

For example, in embodiment 1, averaging of a plurality of slots is calculated by Formula 1 shown below.

$$\text{averaged}R\_n = (R\_n + R\_\{n-1\} + R\{n-2\} + R\_\{n-3\})/4 \quad \text{[FORMULA 1]}$$

The formula (1) is a formula for averaging using past 4 slots, in which R_n shows a received power value of n'th slot. Further, for simplicity of description, cancel due to variation is not considered.

While, an ordinary averaging using FIR filter as shown above is performed in embodiment 1, averaging in embodiment 2 is represented by $$\text{averaged}R\_n = Rn^* + \text{averaged}R\_\{n-1\}^*(1-\alpha) \quad \text{[FORMULA 2]}$$

and exponential weighted averaging (averaging using IIR filter) is performed using the forgetting factor α. For example, when it is assumed as α=0.25, the same averaging effect as averaging of about 4 slots can be obtained. Therefore, by performing such exponential weighted averaging, only one previous value (in the above formula, averaged R_(n−1)) of past received power value may be stored, thereby reducing the calculation amount.

Further, the propagation path variation estimation value and the transmit power changing amount estimation value are also calculation for immediately 1 slot previous values, and the calculation amount can be reduced.

Still further, when the effect of the value using received signals of past slots is to be changed, it can be achieved by changing the factor α.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A CDMA reception apparatus comprising:
propagation path variation estimation means for estimating propagation path variations between respective prior transmit power control sections and a current transmit power control section to obtain propagation path variation estimation values, wherein each of the propagation path variation estimation values is obtained by estimating a propagation path variation between a different corresponding prior transmit power control section and the current transmit power control section;
propagation path variation correction means for generating a plurality of corrected products, each corrected product obtained by multiplying at least one of vector, amplitude and/or power of a received signal of the different corresponding prior transmit power control section by said propagation path variation estimation value obtained by estimating the propagation path variation between the different corresponding prior transmit power control section and the current transmit power control section; and
averaging means for averaging the plurality of corrected products including averaging section setting means for setting an averaging section,
wherein said averaging section setting means comprises:
means for setting said averaging section smaller than the present averaging section when performing communication by a channel in each transmit power control section, in which power of said channel allocated to a signal subjected to received signal power measurement is higher than a predetermined value; and
means for setting said averaging section larger than the present averaging section when performing communication by a channel in each transmit power control section, in which power of said channel allocated to a signal subjected to received signal power measurement is smaller than the predetermined value.

2. The CDMA reception apparatus as claimed in claim 1, wherein said averaging section setting means comprises:
means for setting said averaging section larger than the present averaging section when a partner transmit station transmits a channel whose power is controlled and another channel whose power is not controlled with the same antenna and directivity, and said channel whose transmit power is not controlled transmits a pilot signal; and
means for setting said averaging section smaller than the present averaging section when a partner transmit station does not transmit said channel whose power is controlled and another channel whose power is not controlled with the same antenna and directivity, or said channel whose transmit power is not controlled does not transmit the pilot signal.

3. The CDMA reception apparatus as claimed in claim 1, wherein said averaging section setting means comprises:
traveling speed detection means for detecting a relative traveling speed between a communication partner station and own station; and
means for setting said averaging section smaller than the present averaging section when said detected traveling speed is larger than a predetermined value, and for setting said averaging section to larger than the present averaging section when said detected traveling speed is smaller than the predetermined value.

4. A received signal power measurement method of a CDMA reception apparatus, comprising:
a propagation path variation estimation step for estimating propagation path variations between respective prior transmit power control sections and a current transmit power control section to obtain propagation path variation estimation values, wherein each of the propagation path variation estimation values is obtained by estimating a propagation path variation between a different corresponding prior transmit power control section and the current transmit power control section;
a propagation path variation correction step for generating a plurality of corrected products, each corrected product obtained by multiplying at least one of vector, amplitude and/or power of a received signal of the different corresponding prior transmit power control section and the current transmit power control section; and
an averaging step for averaging the plurality of corrected products including an averaging section setting step for setting an averaging section,
wherein said averaging section setting step comprises:
a step for setting said averaging section smaller than the present averaging section when performing communication by a channel in each transmit power control section, in which power of said channel allocated to a signal subjected to received signal power measurement is higher than a predetermined value; and
a step for setting said averaging section larger than the present averaging section when performing communication by a channel in each transmit power control section, in which power of said channel allocated to a signal subjected to received signal power measurement is smaller than the predetermined value.

5. The received signal power measurement method as claimed in claim 4, wherein said averaging section setting step comprises:
a step for setting said averaging section larger than the present averaging section when a partner transmit station transmits a channel whose power is controlled and another channel whose power is not controlled with the same antenna and directivity, and said channel whose transmit power is not controlled transmits a pilot signal; and
a step for setting said averaging section smaller than the present averaging section when a partner transmit station does not transmit said channel whose power is controlled and another channel whose power is not controlled with the same antenna and directivity, or said channel whose transmit power is not controlled does not transmit the pilot signal.

6. The received signal power measurement method as claimed in claim 4, wherein said averaging section setting step comprises:
a step for detecting a relative traveling speed between a communication partner station and own station; and
a step for setting said averaging section smaller than the present averaging section when said detected traveling speed is larger than a predetermined value, and for setting said averaging section larger than the present averaging section when said detected traveling speed is smaller than the predetermined value.

7. A CDMA reception apparatus comprising:
transmit power changing amount estimation means for estimating changing amounts of transmit power of a communication partner station varied by transmit power control between respective prior transmit power control sections and a current transmit power control section to obtain transmit power changing amount estimation values, wherein each of the transmit power changing amount estimation values is obtained by estimating a transmit power changing amount between a different corresponding prior transmit power control section and the current transmit power control section;

transmit power changing amount correction means for generating a plurality of corrected products, each corrected product obtained by multiplying at least one of vector, amplitude and/or power of a received signal of the different corresponding prior transmit power control section by said transmit power changing amount estimation value obtained by estimating the transmit power changing amount between the different corresponding prior transmit power control section and the current transmit power control section; and averaging means for averaging the plurality of corrected products, including averaging section setting means for setting an averaging section, wherein said averaging section setting means comprises:

means for setting said averaging section smaller than the present averaging section when performing communication by a channel in each transmit power control section in which power of said channel allocated to a signal subjected to received signal power measurement is higher than a predetermined value; and means for setting said averaging section larger than the present averaging section when performing communication by a channel in each transmit power control section in which power of said channel allocated to a signal subjected to received signal power measurement is smaller than the predetermined value.

8. The CDMA reception apparatus as claimed in claim 7, wherein said averaging section setting means comprises:

means for setting said averaging section larger than the present averaging section when a partner transmit station transmits a channel whose power is controlled and another channel whose power is not controlled with the same antenna and directivity, and said channel whose transmit power is not controlled transmits a pilot signal; and means for setting said averaging section smaller than the present averaging section when a partner transmit station does not transmit said channel whose power is controlled and another channel whose power is not controlled with the same antenna and directivity, or said channel whose transmit power is not controlled does not transmit the pilot signal.

9. The CDMA reception apparatus as claimed in claim 7, wherein said averaging section setting means comprises:

traveling speed detection means for detecting a relative traveling speed between a communication partner station and own station; and means for setting said averaging section smaller than the present averaging section when said detected traveling speed is larger than a predetermined value, and for setting said averaging section to larger than the present averaging section when said detected traveling speed is smaller than the predetermined value.

10. A received signal power measurement method of a CDMA reception apparatus, comprising:

a transmit power changing amount estimation step for estimating changing amounts of transmit power of a communication partner station varied by transmit power control between respective prior transmit power control sections and a current transmit power control section to obtain transmit power changing amount estimation values, wherein each of the transmit power changing amount estimation values is obtained by estimating a transmit power changing amount between a different corresponding prior transmit power control section and the current transmit power control section;

a transmit power changing amount correction step for generating a plurality of corrected products, each corrected product obtained by multiplying at least one of vector, amplitude and/or power of a received signal of the different corresponding prior transmit power control section by said transmit power changing amount estimation value obtained by estimating the transmit power changing amount between different corresponding prior transmit power control section and the current transmit power control section; and an averaging step for averaging the plurality of corrected products, including an averaging section setting step for setting an averaging section, wherein said averaging section setting step comprises:

a step for setting said averaging section smaller than the present averaging section when performing communication by a channel in each transmit power control section, in which power of said channel allocated to a signal subjected to received signal power measurement is higher than a predetermined value; and a step for setting said averaging section larger than the present averaging section when performing communication by a channel in each transmit power control section, in which power of said channel allocated to a signal subjected to received signal power measurement is smaller than the predetermined value.

11. The received signal power measurement method as claimed in claim 10, wherein said averaging section setting step comprises:

a step for setting said averaging section larger than the present averaging section when a partner transmit station transmits a channel whose power is controlled and another channel whose power is not controlled with the same antenna and directivity, and said channel whose transmit power is not controlled transmits a pilot signal; and a step for setting said averaging section smaller than the present averaging section when a partner transmit station does not transmit said channel whose power is controlled and another channel whose power is not controlled with the same antenna and directivity, or said channel whose transmit power is not controlled does not transmit the pilot signal.

12. The received signal power measurement method as claimed in claim 10, wherein said averaging section setting step comprises:

a step for detecting a relative traveling speed between a communication partner station and own station; and a step for setting said averaging section smaller than the present averaging section when said detected traveling speed is larger than a predetermined value, and for setting said averaging section larger than the present averaging section when said detected traveling speed is smaller than the predetermined value.

* * * * *

UNITED STATES PATENT AND TRADEMARK OFFICE
CERTIFICATE OF CORRECTION

PATENT NO. : 6,999,427 B1
APPLICATION NO. : 09/619361
DATED : February 14, 2006
INVENTOR(S) : Usuda et al.

Page 1 of 1

It is certified that error appears in the above-identified patent and that said Letters Patent is hereby corrected as shown below:

Drawings
Sheet 1, change "FIG.1" to --FIG.1 – PRIOR ART --

Column 11
Line 18, before "multiplier" change "a" to --α--
Line 56, change "or a is" to --or α is--

Signed and Sealed this

Nineteenth Day of December, 2006

JON W. DUDAS
*Director of the United States Patent and Trademark Office*